United States Patent [19]

Roba

[11] Patent Number: 4,624,692
[45] Date of Patent: Nov. 25, 1986

[54] APPARATUS FOR THE CONTINUOUS PRODUCTION OF OPTICAL FIBRES

[75] Inventor: Giacomo Roba, Via dei pini domestici 5, Cogoleto (Genova), Italy

[73] Assignee: Cselt-Centro Studi Laboratori Telecommunicazioni SpA, Turin, Italy

[21] Appl. No.: 805,848

[22] Filed: Dec. 5, 1985

[30] Foreign Application Priority Data

Dec. 18, 1984 [IT] Italy .................. 68255 A/84

[51] Int. Cl.$^4$ ............................................ C03B 37/023
[52] U.S. Cl. .................................................. 65/1; 65/2; 65/3.13
[58] Field of Search .................... 65/1, 2, 3.1, 3.13

[56] References Cited

U.S. PATENT DOCUMENTS

| 4,453,962 | 6/1984 | Harada et al. | 65/3.15 |
| 4,466,818 | 8/1984 | Brongersma | 65/3.13 |

FOREIGN PATENT DOCUMENTS

| 0067489 | 12/1982 | European Pat. Off. | 65/3.13 |
| 2543720 | 4/1977 | Fed. Rep. of Germany | 65/3.12 |

Primary Examiner—Robert Lindsay
Attorney, Agent, or Firm—Karl F. Ross; Herbert Dubno

[57] ABSTRACT

The apparatus allows the continuous production of optical fibres (15) starting from liquid-phase reactants. They are injected into a pressurized vertical vessel (3), comprising a second coaxial vessel (4), which can be vertically displaced for the variations of the refractive-index profile. The first vessel supplies material for the cladding, the second for the fibre core.

Suitable furnaces (6,9,14) help the reaction and allow preform sintering and drawing.

4 Claims, 1 Drawing Figure

U.S. Patent   Nov. 25, 1986   4,624,692
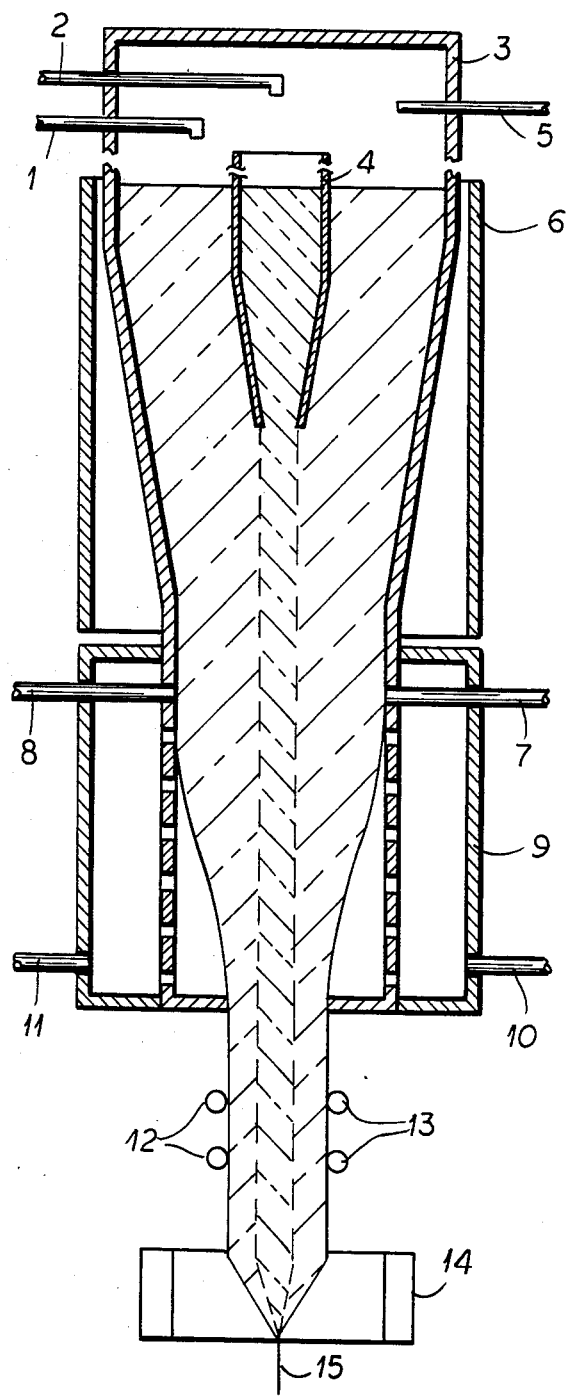

APPARATUS FOR THE CONTINUOUS PRODUCTION OF OPTICAL FIBRES

The present invention relates to the industrial production of transmission media for telecommunications systems using guided light radiations and more particularly it refers to an apparatus for the continuous production of optical fibres.

The research in the domain of telecommunications optical-fibres, after the introduction of vapour-phase deposition techniques (CVD), has allowed results of great interest and importance.

Nowadays multimode and monomode optical-fibres are industrially manufactured with attenuation values ranging between 2 and 4 dB/km at 0.85 $\mu$m wavelength (1st transmission window), 0.5 and 1 dB/km at 1.3 $\mu$m (2nd transmission window), 0.2 and 0.4 dB/km at 1.55 $\mu$m (3rd) transmission window).

Minimum attenuation values practically coinciding with minimum values allowed by intrinsic material properties have been experimentally attained: namely, attenuation values ranging from 0.15 to 0.16 dB/km in the spectral region comprised between 1.5 and 1.6 $\mu$m. Owing to the attainment of so low attenuation values and to rapid developement of optical monomode fibres, optical fibre market has risen.

Nowadays the production is of some million km per year.

Under these conditions, both deposition rate, which directly affects the productivity necessary to meet the increasing demand, and cost-effectiveness are very important problems.

A further problem related to the commercial availability of optical fibres with low-attenuation values, above all in the third transmission window, and in particular in case of monomode fibres, concerns the possibility of increasing the repeater, spacing in long-distance connections. Systems operating at 2 Gbit/s transmission rates with 130 km trunks, without intermediate repeaters, have already been experimented.

Under these conditions, fibre trunks of increasing length with homogeneous characteristics are required.

The techniques nowadays in use for fabricating optical fibres generally are based on high-temperature chemical-vapour deposition (CVD). Said techniques have a settled productivity and their common characteristic is discontinuity.

These techniques comprise two distinct steps: a first step of deposition of the optical material to make an intermediate structure, the so-called "preform", a second step of drawing the preform into a fibre by zone heating at high temperature.

This discontinuity of the fabricating process limits both the productivity and the maximum length of a single trunk.

These drawbacks can be overcome by using more-efficient deposition techniques and a single continuous fabricating process. Various more efficient deposition techniques have been proposed, e.g. the one described in U.S. Pat. No. 4,414,164, in the name of the applicant, based on low-temperature reactions with simultaneous deposition.

Another technique is described in the article "The sol-gel method for optical fiber fabrication" issued on IFOC, Dec. 11, 1982, pages 41–44.

This method is based on slow reactions, controlled at low temperature by mixing liquid reactants.

The common feature of said tecniques is the presence of liquid phases and low temperatures ($<100°$ C.) if compared to those required of more common CVD techniques ($1500 \div 2000°$ C.).

However, these alternative techniques satisfy only the requirement of higher deposition rate. In addition, they present serious problems of controlling the optical properties of the structures to be fabricated and allow no flexibility in the fabrication of fibres with different refractive-index profiles (graded-index profile, step-profile, depressed cladding or w-shaped profile, triangular, profile, segmented-core profile . . . . ).

Said disadvantages are overcome by the apparatus for the continuous production of optical fibres, provided by the present invention which allows pure liquid reactants to be transformed into a vitreous matrix and hence into optical fibres in a single working step, allowing a variation in the refractive-index profile within an unlimited range while keeping the presence of polluting reaction products as low as possible.

The present invention provides an apparatus for the continuous production of optical fibres, in which the materials forming the preform and the dopants for the refractive-index variation are derived from the reaction among liquid reactants, and optical fibres are obtained by drawing the preform heated up to the softening point, characterized in that it comprises:

a first vertical vessel, having the shape of a frustum of cone with the minor base facing the bottom, and hermetically sealed in correspondence with the upper part whereto said liquid reactants are injected through first and second conduits and a pressurization gas through third conduits, in the middle of said first vessel being placed fourth conduits for sucking residual reaction vapours and drying gases, the lateral surface comprised between the fourth conduits and the minor base being made of porous material for the immission of drying gases and the minor base having an axial hole through which the consolidated vitreous material goes downwards;

a second vessel, having the shape of a frustum of cone with the minor base facing the botton and coaxial with said first vessel, whereby it is housed and wherethrough it can translate in vertical direction, the upper base allowing the injection of liquid reactants through a suitable inlet and the lower base allowing the flow downwards of the partly-consolidated material the optical-fibre core is made of;

a first furnace, coaxial with the first vessel and extending from the upper part to the middle of said first vessel, its temperature increasing from top to bottom from room-temperature to the temperature apt both to produce the reaction among the liquid reactants and to obtain solid partly-consolidated material;

a second furnace, coaxial with the first vessel and extending from the middle to the bottom of said first vessel which it close hermetically in order to allow the injection of drying gases through said porous material of the lateral surface and fifth conduits, its temperature increasing from top to bottom till it reaches the vitrification temperature of the material for optical-fibre production;

said first conduits being arranged so that the liquid reactants, apt to produce material for the fibre-cladding fabrication, are poured into the first vessel;

said second conduits being arranged so that liquid reactants, apt to produce the material for the fibre-core fabrication, are poured into the second vessel.

The foregoing and other characteristics of the present invention will be made clearer by the following description of a preferred embodiment thereof given by way of example and not in a limiting sense, and by the annexed drawing showing an apparatus for the continuous production of optical fibres.

The present method is based on the slow growth with constant feeding of liquid material undergoing a thermal gradient at low temperature. Besides, it uses a particular method of controlling the deposition which allows a high degree of productivity with continuous production and doping flexibility.

It makes use of the apparatus shown in the drawing and can use as reactants both organic and inorganic compounds of silicon and doping elements.

The following are worth to be cited:

$SiCl_4$, $SiBr_2Cl_2$, $Si(OC_2H_5)_4$, $Si(C_2H_5)_4$: silicon sources
$GeCl_4$, $GeBr_2Cl_2$, $Ge(OC_2H_5)_4$, $Ge(C_2H_5)_4$: germanium sources
$Al(CH_3)_3$, $Al(C_2H_5)_3$: aluminium sources
$H_2O$, $C_2H_5OH$, $CH_3OH$, $CH_3COOH$: oxygen sources and stabilizers Suitable mixtures of these reactants are introduced in liquid phase, all the compounds considered being liquid at room temperature, from the top of the apparatus.

In particular, the reactants wherefrom fibre cladding materials are derived arrive through a conduit 1 and drop into an external vessel 3 having the shape of a frustum of cone and the reactants for fabricating the core arrive through a conduit 2 and drop into an internal vessel 4, this too having the shape of a frustum of cone, coaxial with vessel 3. Conduit 5 allows the injection of an inert gas, e.g. Ar, by which the pressurization of the upper parts of vessels 3 and 4 is obtained.

The main aim of this pressurization is that of pushing the materials down. The second aim, no less important, is that of preventing the evaporation of gaseous reaction-products.

The vertical motion of reaction gases would cause turbulence in the input zone of liquids altering local mixture concentration and hence introducing density fluctuations into the finished product.

The liquids during their vertical motion downwards meet an increasing thermal gradient (20÷200° C.) generated by an external furnace 6. Due to such a gradient, liquid reactants react assuming first a jelly-like appearance, then becoming a porous consolidated object consisting mainly of silica ($SiO_2$), doping oxides ($GeO_2$, $Al_2O_3$) and polluting materials ($H_2O$, OH, CH).

Volatile products already expelled during said first step are eliminated through sucking channels 7 and 8 present in the middle of vessel 3. The presence of depression zone at the bottom of the first furnace, generated by suction, helps the vertical motion downwards of the volatile compounds.

The rates of taper of vessel 3 and 4 inside the first furnace 6 depend on the volume contraction from the initial liquid phase to the intermediate porous one. The material is consolidated enough to be guided by vessel 3 both into furnace 6, and, at least at the beginning, inside a furnace 9, hermetically sealed onto the external surface of the vessel. Vessel 3 presents in the zone surrounded by furnace 9 a porous wall to allow the introduction of drying gases (He, $Cl_2$).

Said gases are injected into the lower part of furnace 9 through conduits 10 and 11, so that they can reach the suction zone after traversing the preform for a length corresponding to the furnace length. The furnace presents a thermal gradient ranging from 200° to 1100° C.

Inside the furnace, besides the drying of the material a volume contraction takes place with gradual passage from porous material to compact vitreous-state material.

At the output of the furnace two pairs of traction elements 12 and 13 move the preform at the correct feeding rate inside the next drawing furnace 14, wherefrom fibre 15 is pulled.

Taking into account standard optical fibres with a 125 μm diameter at the 10 m/s drawing rate, a productivity degree of about 16 g/min of vitreous material is obtained.

Under these conditions by supporting that the consolidated preform has a 50 mm diameter, the feeding rate controlled by pairs 12 and 13 is to be of 0.225 m/h. Besides, to allow at least a 6-hour preform drying time, furnace 9 must be at least 1.35 m high.

The liquid mixture density can be considered of about 1 $kg/dm^3$, while consolidated silica density is 2.2 $kg/dm^3$. The passage from the initial to the final density value is gradual and takes place during the material movement towards the drawing furnace.

Density variation is accompanied by a 70% volume contraction.

This contraction is compensated for by the taper of vessels 3 and 4, that is why the movement speed can be considered constant.

At 0.225 m/h mean speed, and considering that porous compound preforming takes 10 hours, total length $L_0$ of furnace 6 must be of 2.25 m.

The dopant concentration profile C(R) in the silica matrix in function of radius R depends on the initial concentration of dopant $C_0$ in the liquid mixture and on the physical parameters of vessels inside the first furnace 6:

$$C(R) = f(C_0, L, R)$$

where L is the distance between the upper edge of furnace 6 and the lower edge of vessel 4.

E.g., if graded-index profiles are required, similar concentration profiles are to be inplemented:

$$C(R) = C_0[1 - (R/a)^\alpha] + K$$

where:
α is a coefficient varying between 0 and ∞; it typically has a value ranging from 1.8 to 2.1 for graded-profile fibres,
a is the core radius,
K is a constant equal to the concentration value in the external part of the fibre.

Such concentration profile is approximated by exploiting the phenomena of concentration and thermal diffusion.

In this case, if compared to classical diffusion, different types of diffusion are obtained at various levels L of introduction of the dopant.

Hence different degrees of freedom are possible.

In fact, during the translation from position L=0, where the lower edge of vessel 4 is at the same level as that of the upper edge of furnace 6, to position $L=L_0$, where the lower edges of vessel 4 and of furnace 6 are at the same level, there is the gradual passage from the high mobility of liquid state, to the much-reduced mobility of consolidated porous state. This is due to the fact that the temperatures at which reactants can be found at the bottom of vessel 4 are in the two cases equal to room temperature and to the maximum temperature reached by furnace 6 respectively, i.e. 200° C.

In these two extreme cases the following concentration profiles are obtained:

($L=0$)
$\alpha=0$
$C(R)=K=C_o/(1+((R_2/R_1)^2-1)/(1+\delta'M/\delta M'))$
$a=R_2$
($L=L_o$)
$\alpha=$Infinite
$C(R)=C_o+K$ if $-a<R<a$
$C(R)=0$ if $|R|=a$
$a=R_1$ In this case, in the absence of diffusion outside the core, the most general condition can be imposed:

$C(R)=0$ if $|R|\geqq a$ where:

$R_2$ and $R_1$ are the radii of external and internal vessels 3 and 4 at level L, respectively;

$\delta'$ and $\delta$ are the density of the dopant and the silica respectively;

$M'$ and $M$ are the molecular masses of the dopant and silica respectively.

It will be sufficient to introduce to a lesser or greater extent vessel 4 into furnace 6 to obtain the desired value of $\alpha$ and hence the desired refractive-index profile in the produced fibre.

The above description has been given only by way of example and not in a limiting sense. Variations and modifications can be made while remaining within the scope of the invention.

I claim:

1. An apparatus for the continuous production of optical fibres, in which the materials forming the preform and the dopants for the refractive-index variation are derived from the reaction among liquid reactants, and optical fibres are obtained by drawing the preform heated up to the softening point, characterized in that it comprises:

a first vertical vessel (3), having the shape of a frustum of cone with the minor base facing the bottom, and hermetically sealed in correspondence with the upper part whereto said liquid reactants are injected through first (1) and second (2) conduits and a pressurization gas through third conduits (5), in the middle of said first vessel being placed fourth conduits (7,8) for sucking residual reaction vapours and drying gases, the lateral surface comprised between the fourth conduits and the minor base being made of porous material for the immission of drying gases and the minor base having an axial hole through which the consolidated vitreous material goes downwards;

a second vessel (4), having the shape of a frustum of cone with the minor base facing the bottom and coaxial with said first vessel, whereby it is housed and wherethrough it can translate in vertical direction, the upper base allowing the injection of liquid reactants through a suitable inlet and the lower base allowing the flow downwards of the partly-consolidated material the optical-fibre core is made of;

a first furnace, (6) coaxial with the first vessel (3) and extending from the upper part to the middle of said first vessel, its temperature increasing from top to bottom from room-temperature to the temperature apt both to produce the reaction among the liquid reactants and to obtain solid partly consolidated material;

a second furnace, (9) coaxial with the first vessel (3) and extending from the middle to the bottom of said first vessel, which it closes hermetically in order to allow the injection of drying gases through said porous material of the lateral surface and fifth conduits (10,11), its temperature increasing from top to bottom till it reaches the vitrification temperature of the material for optical-fibre production;

said first conduits (1) being arranged so that the liquid reactants, apt to produce material for the fibre-cladding fabrication, are poured into the first vessel (3);

said second conduits (2) being arranged so that liquid reactants, apt to produce the material for the fibre-core fabrication, are poured into the second vessel (4).

2. An apparatus as in claim 1, characterized in that the tamper of said first (3) and second (4) vessels is such as to compensate for volume contraction of liquid-state reactants during the reaction wherefrom solid materials forming the preform derive.

3. An apparatus as in claim 2, characterized in that said first furnace (6) has at least such a length that it allows the preforming of solid partly-consolidated material at the material movement speed.

4. An apparatus as in claim 3, characterized in that said second furnace (9) has at least such a length that it allows the preform to be dried at the material movement speed.

* * * * *